United States Patent
Nago

(10) Patent No.: US 9,794,439 B2
(45) Date of Patent: Oct. 17, 2017

(54) IMAGE FORMING APPARATUS

(71) Applicant: Sharp Kabushiki Kaisha, Osaka-shi, Osaka (JP)

(72) Inventor: Daisuke Nago, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 220 days.

(21) Appl. No.: 14/749,871

(22) Filed: Jun. 25, 2015

(65) Prior Publication Data
US 2016/0044199 A1  Feb. 11, 2016

(51) Int. Cl.
*H04N 1/00* (2006.01)

(52) U.S. Cl.
CPC ....... *H04N 1/00875* (2013.01); *H04N 1/0097* (2013.01); *H04N 1/00244* (2013.01); *H04N 1/00392* (2013.01); *H04N 1/00411* (2013.01); *H04N 1/00477* (2013.01); *H04N 1/00925* (2013.01); *H04N 2201/0094* (2013.01)

(58) Field of Classification Search
USPC ...... 358/474, 1.15, 1.9, 1.16, 400, 401, 440, 358/442, 441, 444
See application file for complete search history.

(56) References Cited

U.S. PATENT DOCUMENTS

2006/0093389 A1  5/2006  Tose
2011/0185208 A1*  7/2011  Iwamoto ............... G06F 1/3203
                                                       713/323
2014/0071477 A1*  3/2014  Akazawa ........... H04N 1/00891
                                                        358/1.14
2014/0078850 A1*  3/2014  Eguchi ..................... G11C 5/14
                                                         365/227
2014/0160517 A1*  6/2014  Masuyama ........ H04N 1/00896
                                                        358/1.14
2015/0172492 A1*  6/2015  Eguchi ............... H04N 1/00888
                                                        358/1.13
2015/0355989 A1* 12/2015  Hayden ............... G06F 11/3027
                                                         714/56

FOREIGN PATENT DOCUMENTS

| JP | 2004-328438 A | 11/2004 |
| JP | 2006-133998 A | 5/2006 |
| JP | 2009-202388 A | 9/2009 |
| JP | 2011-23893 A | 2/2011 |
| JP | 2013-225720 A | 10/2013 |

* cited by examiner

*Primary Examiner* — Jerome Grant, II
(74) *Attorney, Agent, or Firm* — Keating and Bennett, LLP

(57) ABSTRACT

An image forming apparatus includes a first controller, a display panel, a touch panel, a timer, a first storage unit storing a timeout period, and a first communication unit communicating with an external apparatus. When a user selects a predetermined service provided by the image forming apparatus, the first storage unit changes the timeout period to a value obtained from an external apparatus providing the selected service. The first controller uses the changed timeout period to determine whether or not a timeout process is to be performed.

10 Claims, 10 Drawing Sheets

IMAGE FORMING APPARATUS

BACKGROUND

1. Field

The present disclosure relates to an image forming apparatus.

2. Description of the Related Art

Image forming apparatuses (typically copiers) are installed in public spaces such as convenience stores, and copy service is available on a chargeable basis. Other than copy service, print service for printing image data recorded in a portable memory or the like is also available.

In recent years, when multifunction peripherals (MFP) which are a type of image forming apparatus are installed, in addition to copy service and print service, facsimile service, print service compatible with a communication network (hereinafter simply referred to as a network), and the like are also provided by connecting the MFPs to the Internet. In addition, the MFPs are used as a gateway for providing content service provided by content providers via the Internet.

For example, one of known services is a service called a content print service. To make this service available, an MFP is provided with an original framework for achieving a Web browser function used in a personal computer (PC) or the like, inside the MFP. To provide a content print service, data for generating an operation screen operable in the framework in the MFP is transmitted from a server computer (hereinafter simply referred to as a server) of a content provider via a relay server to the MFP. The MFP generates the operation screen on the basis of the received data, and displays the operation screen on an operation panel. Thus, a user may operate (e.g., touch) the operation screen displayed on the operation panel of the MFP, and may select a desired content from various pieces of content provided by the server, and may print the selected content.

In such an MFP, while a user is using a service such as a content print service, when the user has not operated the operation panel for a predetermined time (for example, 120 seconds) or more, the service is ended, and a home screen is displayed (hereinafter also referred to as occurrence of a no-operation timeout). Typically, a predetermined time (hereinafter also referred to as a no-operation timeout period) until a no-operation timeout occurs is independent of a content service or a server with which the MFP is being communicated, and is set for the MFP at a fixed value.

A technique has been disclosed in Japanese Unexamined Patent Application Publication No. 2006-133998 to address the program occurring due to a fixed no-operation timeout period. In the technique, an image forming apparatus having a reset function (an automatic clear function of initializing the display condition and parameters which have been set, or a function of stopping power supply to an operation panel and the like in order to reduce power consumption) to be performed when a no-operation state has been continued for a predetermined time does not perform the reset function when a predetermined time has elapsed while the image forming apparatus is executing an execute file producing collaborative operations with an external apparatus or is performing data communication with an external apparatus.

An image forming apparatus installed at a public location such as a convenience store provides a variety of content services offered by content providers, and provides a variety of content. Times taken for a user to perform screen operations are different from each other depending on the services and the content. Therefore, if a predetermined fixed timeout period (for example, 120 seconds) is used in the image forming apparatus, the frequency of occurrence of a no-operation timeout may be high in some operation screens.

For example, a screen showing the telephone number of a call center which is used when a user has some trouble may be displayed in some content services, and the user who has a trouble with a screen operation may call the call center. In this case, if the call does not end within the predetermined time (for example, 120 seconds), a timeout may occur during the call, and the service may be ended.

A timeout period which is set long may reduce the frequency of occurrence of a timeout. However, in the case where a user goes somewhere without completing an operation, an operation screen which is needlessly displayed may hinder another user from being offered a new service at once.

The technique which has been disclosed in Japanese Unexamined Patent Application Publication No. 2006-133998 may fail to address this situation, and this situation itself is not recognized in the technique described in Japanese Unexamined Patent Application Publication No. 2006-133998.

SUMMARY

Therefore, the disclosure provides an image forming apparatus in which content services provided by content providers via a network are available and which enables a no-operation timeout period to be changed as appropriate in accordance with the condition.

An image forming apparatus according to an aspect of the disclosure includes a display unit, a detection unit, a time measurement unit, a storage unit, a determining unit, a controller, and a communication unit. The display unit displays an operation screen. The detection unit detects a user operation on the operation screen. The time measurement unit measures a period during which the detection unit does not detect an operation. When no user operations are continuously detected, the storage unit stores a timeout period which is an upper limit time until a timeout process of displaying a home screen is performed. The determining unit determines whether or not the timeout period has elapsed, by using the time measurement unit. The controller causes the display unit to perform the timeout process, when the determining unit determines that the timeout period has elapsed. The communication unit receives provision of a service from an external apparatus via a communication network. When the detection unit detects a user selecting a predetermined service, the storage unit changes the timeout period in accordance with the selected predetermined service or the external apparatus providing the selected predetermined service.

DESCRIPTION OF THE EMBODIMENTS

Figure 1:
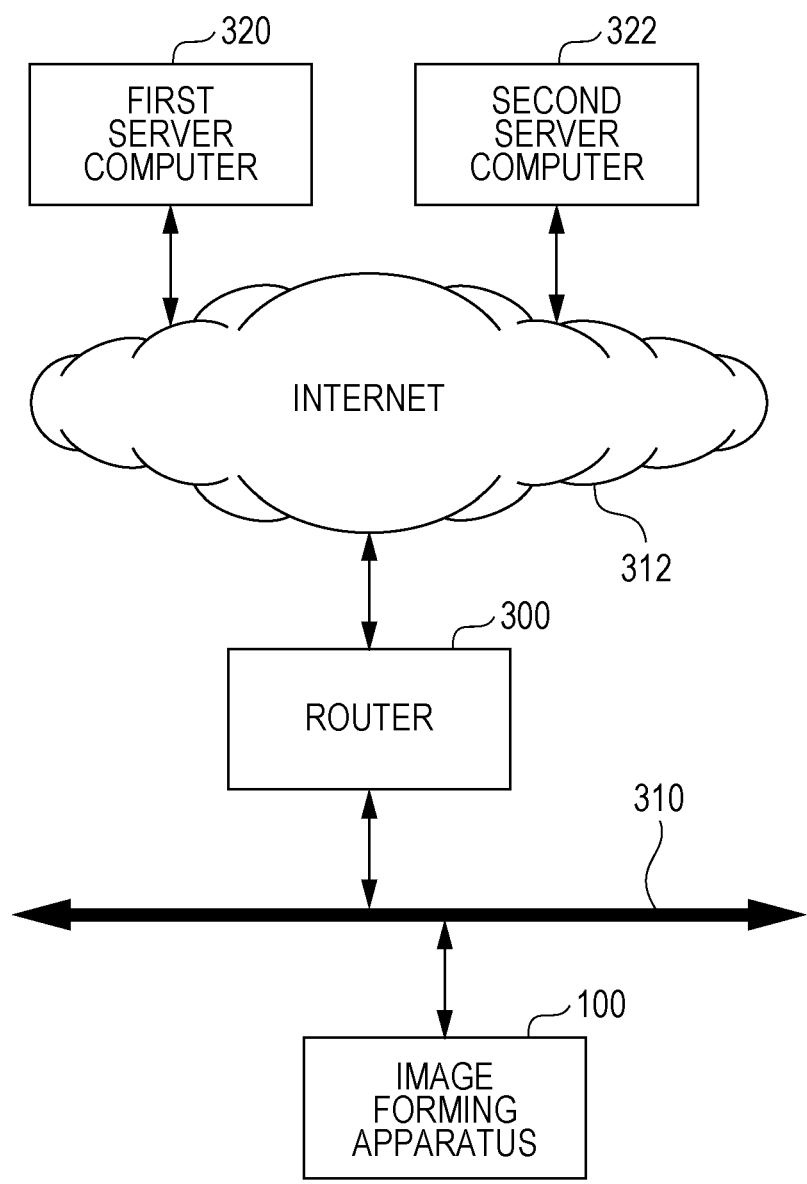
FIG. 1 is a block diagram illustrating the configuration in which an image forming apparatus is connected to a network, according to a first embodiment of the disclosure.

In embodiments described below, an identical reference numeral is assigned to identical components. The names and functions of the identical components are also the same. Therefore, repeated detailed description about them will not be avoided.
First Embodiment Referring to FIG. 1, an image forming apparatus 100 according to a first embodiment is used in such a manner as to be connected to a network 310 such as a local-area network (LAN). The network 310 is connected to the Internet 312 via a router 300. A first server computer 320 and a second server computer 322 are connected to the Internet 312. Such a configuration enables the image forming apparatus 100 to access the first server computer 320 and the second server computer 322 via the router 300 and the Internet 312.

Not only server computers but also various apparatuses are connected to the Internet 312. In this example, only the first server computer 320 and the second server computer 322 are illustrated as servers for providing content services. Apparatuses other than the image forming apparatus 100 may be connected to the network 310.

Figure 2:
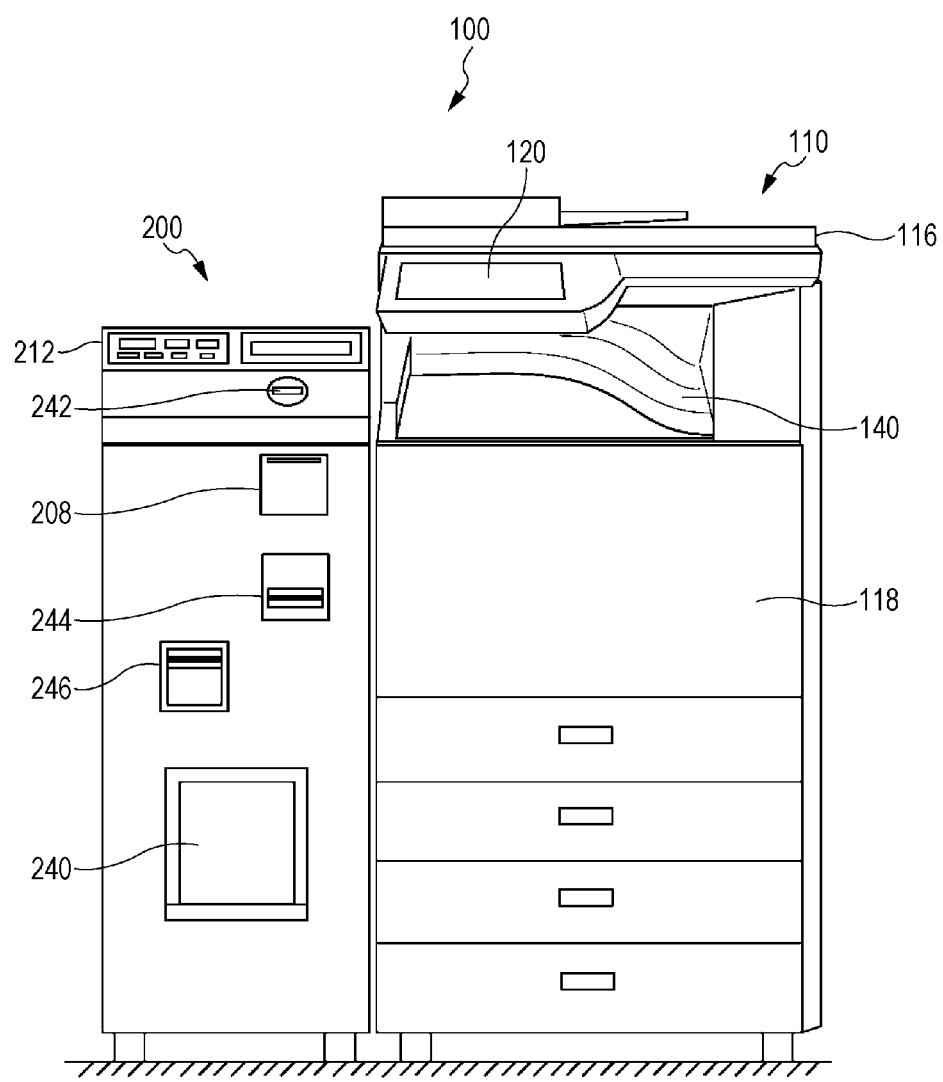
FIG. 2 is a front view of the image forming apparatus according to the first embodiment.

Referring to FIG. 2, the image forming apparatus 100 includes an apparatus body 110 and an extension apparatus 200. The apparatus body 110 and the extension apparatus 200 are connected to each other, and are capable of exchanging data (including control information). The way of connection is any, such as serial connection, e.g., Universal Serial Bus (USB), or communication network connection (wired connection or wireless connection).

The apparatus body 110 receives a user instruction via an operation unit 120, and performs a process according to the instruction, such as image formation. When the extension apparatus 200 is to perform the process specified by the instruction, the apparatus body 110 transmits data used in the process, to the extension apparatus 200. The extension apparatus 200 uses the received data to carry out the user instruction. An instruction for image formation (hereinafter also referred to as printing) is carried out by the apparatus body 110 or the extension apparatus 200 in accordance with the print condition. The apparatus body 110 discharges a print result onto a paper output tray 140.

The extension apparatus 200 includes a media interface (IF) unit 212 to which a portable storage medium such as a flash memory card may be mounted. The extension apparatus 200 discharges a print result to a photograph output unit 240. Services provided by the image forming apparatus 100 are available on a chargeable basis. The extension apparatus 200 performs a charging process. That is, the extension apparatus 200 receives money inserted by a user from a coin insertion unit 242 and a bill insertion unit 244, and discharges the difference between the inserted money and the charge for printing to a change output unit 246.

Figure 3:
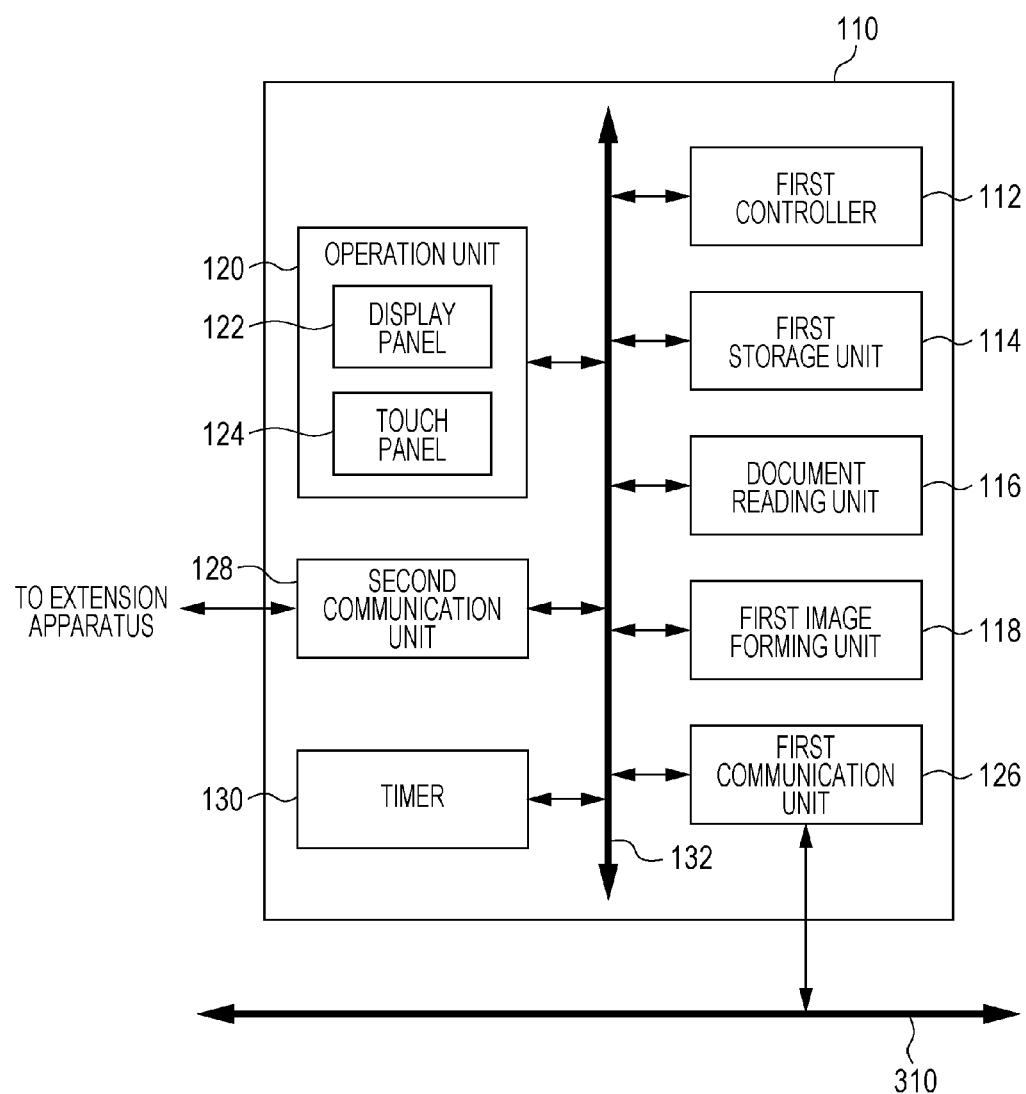
FIG. 3 is a block diagram illustrating the internal configuration of an apparatus body included in the image forming apparatus illustrated in FIG. 2.
Figure 4:
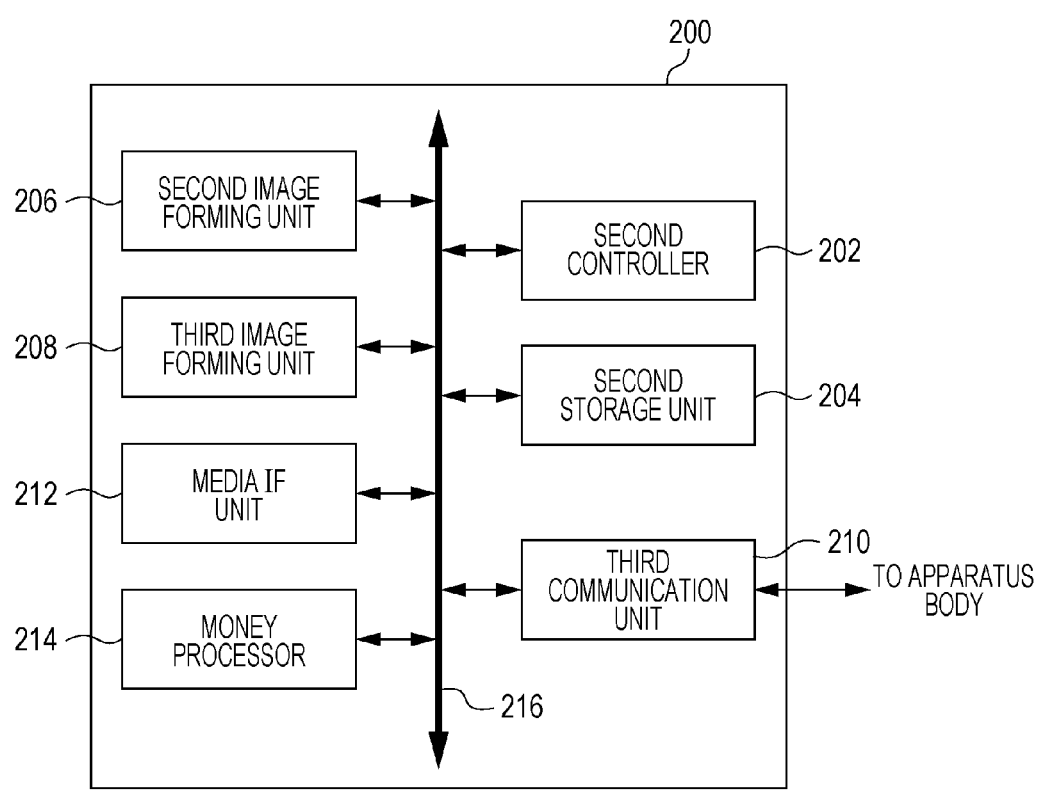
FIG. 4 is a block diagram illustrating the internal configuration of an extension apparatus included in the image forming apparatus illustrated in FIG. 2.

Referring to FIGS. 3 and 4, the configurations of the apparatus body 110 and the extension apparatus 200 will be described more specifically. The apparatus body 110 and the extension apparatus 200 include similar components. For convenience sake, terms including the words "first" to "third" are used to differentiate these components.

Referring to FIG. 3, the apparatus body 110 includes a first controller 112, a first storage unit 114, a document reading unit 116, a first image forming unit 118, the operation unit 120, a first communication unit 126, a second communication unit 128, and a timer 130. The apparatus body 110 also includes a first bus 132 to which these units are connected. Data (including control information) exchange between the units is performed via the first bus 132.

The first controller 112 is, for example, a central processing unit (CPU). The first storage unit 114 includes storage devices such as a read only memory (ROM), a random access memory (RAM), and a hard disk drive (HDD). The ROM which is a nonvolatile storage device stores programs and data used to control operations of the apparatus body 110. The HDD which is a rewritable nonvolatile storage device stores image data and the like. The RAM is a rewritable volatile storage device. The first controller 112 reads predetermined programs and predetermined data from the ROM and the HDD to the RAM, and uses part of the RAM as a work area to execute the programs. For example, image processing on image data is performed on the RAM. The first controller 112 controls the entire apparatus body 110 according to the programs stored in the ROM, achieving a copy function of the apparatus body 110.

The document reading unit 116 includes a charge coupled device (CCD) for reading a document, and a document detection sensor detecting a document which is set on a document platen or an automatic document feeder (ADF), and reads a document so that image data is input. The image data is temporarily stored, for example, in the RAM of the first storage unit 114.

The first image forming unit 118 prints image data generated by performing various types of image processing on the read image data, on recording paper fed from a first paper feed unit (not illustrated) in the apparatus body 110. The first paper feed unit of the apparatus body 110 contains, for example, recording paper of B5, B4, A4, and A3.

The first communication unit 126 is an interface for apparatus body 110 communicating with external apparatuses via the network 310 or a telephone line (not illustrated). The first communication unit 126 includes a network interface card (NIC) connected to the network 310. The first communication unit 126 also includes a modem connected to the telephone line.

The second communication unit 128 is an interface for communicating with the extension apparatus 200 under the control of the first controller 112.

Figure 5:
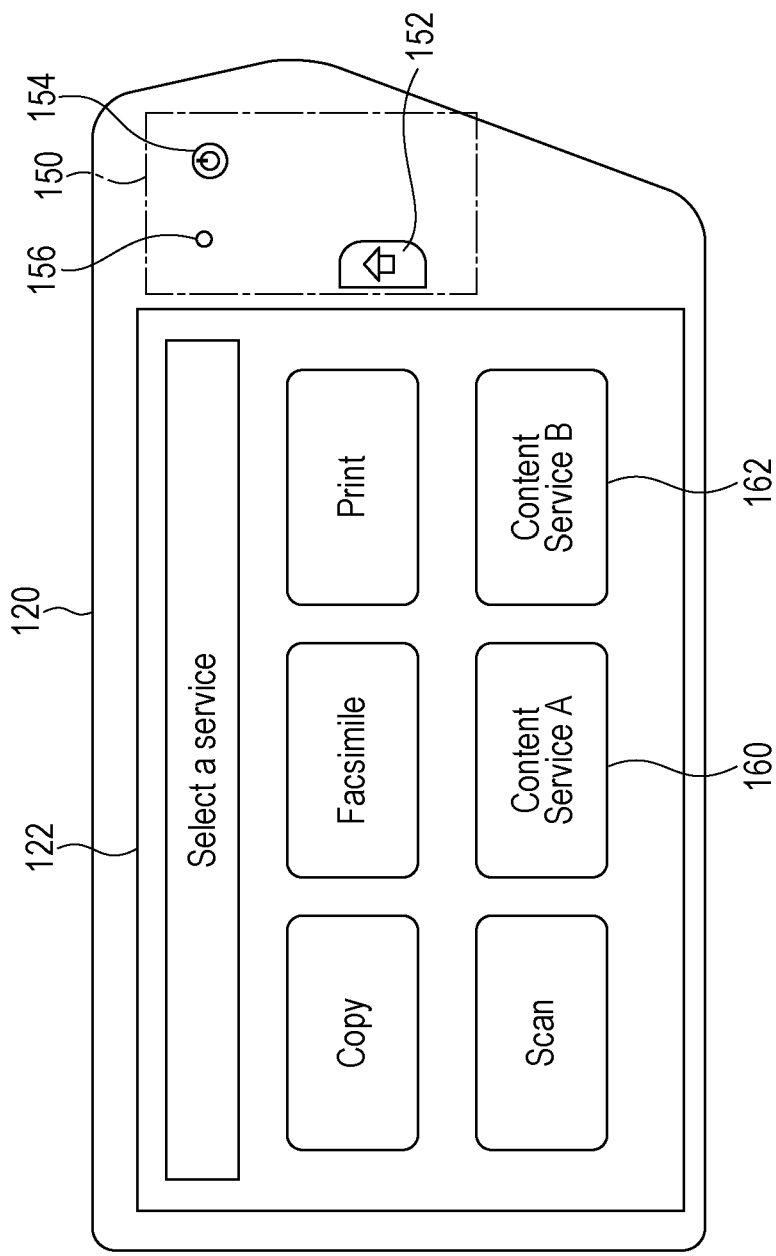
FIG. 5 is a plan view of an operation unit of the image forming apparatus illustrated in FIG. 2.

The operation unit 120 includes a display panel 122 formed by a liquid crystal panel or the like, and a touch panel 124 which is disposed on the display panel 122 and which detects a touched position. Hardware keys may be disposed on the operation unit 120. Referring to FIG. 5, a home screen is displayed on the display panel 122 of the operation unit 120. The home screen is displayed, for example, just after startup of the image forming apparatus 100 or upon occurrence of a timeout. In the home screen, keys (software keys) for selecting a service available in the image forming apparatus 100 are displayed.

On the operation unit 120, a home key 152, a power key 154 for turning on/off the power, and a light-emitting diode (LED) lamp 156 which lights when the power is on are disposed as hardware keys in an area 150 located outside the display panel 122. A screen displayed on the display panel 122 is changed (subjected to screen transition) from one to another in accordance with the state of the image forming apparatus 100. The home key 152 is a key for returning the screen displayed on the display panel 122 back to the home screen.

The operation unit 120 receives input of, for example, an instruction supplied to the apparatus body 110 from a user. Specifically, a screen (image) displayed on the display panel 122 is generated by a screen generating unit (not illustrated) under the control of the first controller 112. A user selects a key displayed as an icon or the like on the display panel 122, on the touch panel 124 overlying the display panel 122 (touches a corresponding portion of the touch panel 124). This operation allows a service provided by the image forming apparatus 100 to be selected, and allows function setting, transmission of an instruction to perform an operation, and the like to be performed. A user may use screens displayed on the display panel 122 to check the state of the image forming apparatus 100, the processing state of a job, and the like.

The first controller 112 monitors user operations performed on the hardware keys and the touch panel 124 provided on the operation unit 120, and displays, for example, information to be supplied to the user, such as information about the state of the image forming apparatus 100, on the display panel 122. In the case where the first controller 112 has received a user operation, when the user instruction is to be carried out by the extension apparatus 200, the first controller 112 transmits data used by the extension apparatus 200 performing the process, via the second communication unit 128. The data includes an instruction command for the extension apparatus 200, image data, text data, and numeric data.

The timer 130 which has received a request from the first controller 112 outputs information representing the current time (hereinafter simply referred to as the current time) to the first controller 112.

Referring to FIG. 4, the extension apparatus 200 includes a second controller 202, a second storage unit 204, a second image forming unit 206, a third image forming unit 208, a third communication unit 210, the media IF unit 212, and a money processor 214. The extension apparatus 200 further includes a second bus 216 to which these units are connected. Data (including control information) exchange between the units is performed via the second bus 216.

The second controller 202 is, for example, a CPU. Similarly to the first storage unit 114, the second storage unit 204 includes storage devices, such as a ROM, a RAM, and an HDD. The ROM stores programs and data used to control operations of the extension apparatus 200. The second controller 202 reads predetermined programs and predetermined data from the ROM and the HDD to the RAM, and uses part of the RAM as a work area to execute the programs. For example, image processing on image data is also performed on the RAM. The second controller 202 controls the entire extension apparatus 200 according to the programs stored in the ROM, achieving the functions of the extension apparatus 200.

The third communication unit 210 communicates with the second communication unit 128 of the apparatus body 110 under the control of the second controller 202. The way of connection between the second communication unit 128 and the third communication unit 210 is serial connection such as USB.

The media IF unit 212 includes a drive for mounting an optical disk, and a socket for mounting a portable memory. The media IF unit 212 enables the image forming apparatus 100 to read and write data from/to an optical disk or a portable memory which is mounted. Optical disks include various disks, such as a compact disk recordable (CD-R) disk and a digital versatile disk random-access memory (DVD-RAM) disk. Portable memories include various memories, such as a USB memory and a flash memory card, e.g., a secure digital (SD) memory card, a memory stick, or a CompactFlash®.

The media IF unit 212 reads image data specified as a print target, from a mounted medium. The read image data is printed by the second image forming unit 206 or the first image forming unit 118 of the apparatus body 110. The media IF unit 212 stores image data which is generated by the document reading unit 116 of the apparatus body 110 and which is received via the third communication unit 210.

The second image forming unit 206 which has received control of the second controller 202 prints image data read from the media IF unit 212 or image data received from the apparatus body 110 on recording paper fed from a paper feed unit (not illustrated) in the extension apparatus 200. Recording paper on which printing has been performed is discharged from the photograph output unit 240 (see FIG. 2). The second image forming unit 206 is, for example, a dye-sublimation printer suitable for photo printing. The paper feed unit of the extension apparatus 200 contains, for example, L size recording paper (89×127 mm) as recording paper having a size used in typical photo printing.

The third image forming unit 208 which has received control of the second controller 202 prints data about charge which is received from the apparatus body 110, on predetermined recording paper, and discharges the paper. The third image forming unit 208 is, for example, a thermal printer. The third image forming unit 208 contains, for example, rolled thermal paper, and prints information (text) received from the apparatus body 110 on thermal paper which is pulled out from the roll. Thus, the extension apparatus 200 may issue a receipt.

The money processor 214 which has received control of the second controller 202 conveys coins inserted from the coin insertion unit 242 to predetermined storages by classifying the coins according to the type, houses the coins, and calculates the amount of inserted money. The calculation result (the amount of inserted money) is transmitted to the second controller 202. According to an instruction supplied from the second controller 202, the money processor 214 conveys the specified types and the specified numbers of coins from the storages to the change output unit 246, and discharges the coins.

The money processor 214 which has received control of the second controller 202 conveys bills inserted from the bill insertion unit 244, to predetermined storages by classifying the bills according to the type, houses the bills, and calculates the amount of inserted money. The calculation result (the amount of inserted money) is transmitted to the second controller 202. According to an instruction from the second controller 202, the money processor 214 conveys the specified types and the specified numbers of bills from the storages to the change output unit 246, and discharges the bills.

A copy service, a print service, a scan service, a facsimile service, and a content service which are provided by the image forming apparatus 100 will be briefly described.

Copy Service

In a copy service, image data of a document read by the document reading unit 116 is output as a copy from the first image forming unit 118 of the apparatus body 110 or the second image forming unit 206 of the extension apparatus 200.

The CCD included in the document reading unit 116 may electrically read the image of a document which is set at a reading position. The image data obtained through reading is stored as output data (print data) on the RAM of the first storage unit 114.

When printing is to be performed by using the first image forming unit 118 of the apparatus body 110, the image data on the RAM is transmitted to the first image forming unit 118 at the timing of image formation. The recording paper is pulled out by pickup rollers from the first paper feed unit, and is conveyed to the first image forming unit 118 by using multiple conveying rollers. The first image forming unit 118 exposes a charged photoconductor drum to light in accordance with image data which is input, whereby an electrostatic latent image according to the image data is formed on the surface of the photoconductor drum. After toner is adhered to the electrostatic latent image portion on the photoconductor drum, the toner image is transferred to the recording paper which has been conveyed, via a transfer belt. After that, the recording paper is heated and pressurized (this causes the image to be fixed on the recording paper), and is discharged to the paper output tray 140.

Upon reception of a user instruction, the second image forming unit 206 (dye-sublimation printer) of the extension apparatus 200 prints a high-resolution image such as a photographic document. When printing is to be performed by the second image forming unit 206, image data on the RAM of the first storage unit 114 of the apparatus body 110 is transmitted to the extension apparatus 200 via the second communication unit 128. The second controller 202 stores the received image data in the RAM of the second storage unit 204. After that, the second controller 202 reads image data from the RAM, controls the second image forming unit 206 so that an image is formed on recording paper (for example, L size) as described above, and discharges the recording paper from the photograph output unit 240.

Print Service

In a print service, image data received from an external apparatus via the first communication unit 126 is printed. The first communication unit 126 receives image data from a terminal (not illustrated in FIG. 1) such as a PC connected to the Internet 312. The received image data is stored in the first storage unit 114. After that, similarly to the copy service, image data is generated for each page, and is printed by the first image forming unit 118 or the second image forming unit 206.

Scan Service

In a scan service, the document reading unit 116 reads a document which is set, generates image data, and stores the generated image data in a portable medium or the like. The apparatus body 110 transmits the image data generated by the document reading unit 116 reading the document, via the second communication unit 128 and the third communication unit 210 to the extension apparatus 200. The extension apparatus 200 controls the media IF unit 212 so that the image data received via the third communication unit 210 is stored in a medium inserted by a user in the media IF unit 212.

Facsimile Service

In a facsimile service, image data which is read by the document reading unit 116 is transmitted to an external facsimile. The CCD included in the document reading unit 116 electrically reads the image of a document which is set at a reading position. The image data obtained through reading is stored in the RAM of the first storage unit 114. The image data stored in the first storage unit 114 is converted into a data format for fax communication, and is transmitted to an external facsimile via a facsimile modem and a telephone network.

Content Service

Content providers provide animations, image data of characters, illustrations, and the like, photographic data of athletes, musical score information, map information, newspaper information, and the like. Pieces of provided content are different depending on content providers. Content is supplied from server computers connected to the Internet. In a content service, content provided by a content provider is printed.

The image forming apparatus 100 which has received an operation performed on the operation unit 120 by a user accesses a server computer (for example, the first server computer 320) of a predetermined content provider via the first communication unit 126, and obtains content wanted by the user. The obtained content (image data) is stored in the first storage unit 114. After that, similarly to the copy service, the image data is printed by the first image forming unit 118 or the second image forming unit 206.

Figure 6:
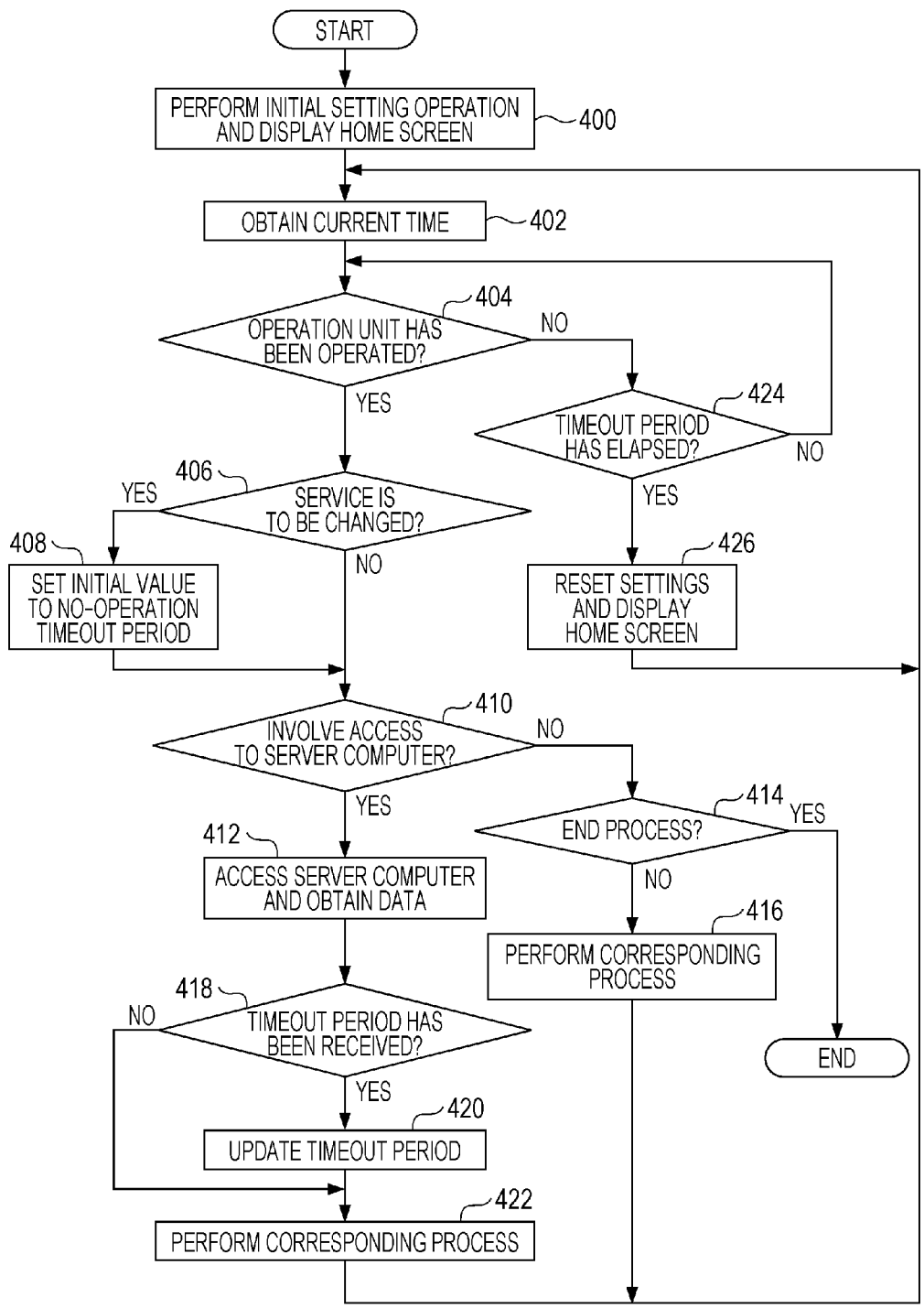
FIG. 6 is a flowchart illustrating the control structure of a program which is executed in the image forming apparatus illustrated in FIG. 2 to provide a service by changing a timeout period as appropriate.

Referring to FIG. 6, the control structure of a program for changing the no-operation timeout period in accordance with the condition as appropriate in the image forming apparatus 100 will be specifically described below.

In this example, it is assumed that, for a service (such as a copy service or a scan service) which may be provided by the image forming apparatus 100 by itself, an operation screen on which a user performs setting is generated by using data stored in the HDD of the first storage unit 114 in advance, and is displayed on the display panel 122. In contrast, for a content service, the image forming apparatus 100 does not store data for generating a user operation screen (for example, a screen in which multiple icons representing pieces of content are arranged and in which a selection operation is received) in the first storage unit 114. The image forming apparatus 100 receives data from server computers providing content, and uses the data to generate an operation screen. The image forming apparatus 100 displays the operation screen, for example, by using a web browser which is a known application program. The data for generating an operation screen is data having a format processable by the web browser used in the image forming apparatus 100, and may be constituted by multiple files. Thus, an operation screen specific to the content service selected by a user is displayed on the display panel 122.

When a key 160 for specifying a content service A is selected, the image forming apparatus 100 accesses the first server computer 320. When a key 162 for specifying a content service B is selected, the image forming apparatus 100 accesses the second server computer 322. That is, the key 160 is associated with an access path to a predetermined area or a predetermined file in a storage device (for example, an HDD) of the first server computer 320. Similarly, the key 162 is associated with an access path to a predetermined area or a predetermined file in a storage device of the second server computer 322.

When the power of the image forming apparatus 100 is turned on, the first controller 112 performs a warm-up and an initial setting operation for causing the functions of the image forming apparatus 100 to be ready to be performed, and displays the home screen (see FIG. 5) on the display panel 122 in step 400. In the initial setting operation, an initial value (for example, 120 seconds) is set as the no-operation timeout period.

In step 402, the first controller 112 obtains the current time from the timer 130, and stores the current time as a start time in the RAM of the first storage unit 114. When a start time is already stored in the first storage unit 114, the start time is overwritten with the new start time (the obtained current time).

In step 404, the first controller 112 determines whether or not the operation unit 120 has been operated. Specifically, the first controller 112 determines whether or not either one of the touch panel 124, the home key 152, and the power key 154 has been pressed. When it is determined that the operation unit 120 has been operated, the process proceeds to step 406. Otherwise, the process proceeds to step 424. For the touch panel 124, when an area on the touch panel 124 which corresponds to a key displayed on the display panel 122 is touched, it is determined that the operation unit 120 has been operated. Even if an area on the touch panel 124 which does not correspond to a key displayed on the display panel 122 is touched, it is not determined that the operation unit 120 has been operated.

In step 406, the first controller 112 determines whether or not an operation which has been detected in step 404 is an operation for changing a service. An operation for changing a service is, for example, the following operation. In a state in which a user is being provided with the content service from the first server computer 320 by touching the content service A key 160 in FIG. 5, the user selects a key (for example, the content service B key 162, or the copy key) for specifying another service. An operation of pressing the home key 152 is included in operations for changing a service. If it is determined that the operation is an operation for changing a service, the process proceeds to step 408. Otherwise, the process proceeds to step 410.

In step 408, the first controller 112 sets an initial value (for example, 120 seconds) to the no-operation timeout period. As described below, the no-operation timeout period may have been changed to a value different from the initial value. Use of the value which has been changed may cause a trouble in some services. Therefore, in step 408, the no-operation timeout period is returned back to the initial value.

In step 410, the first controller 112 determines whether or not the operation which has been detected in step 404 involves an instruction to access a server computer. Some keys disposed in the operation screen displayed on the display panel 122 are associated with access information such as a uniform resource locator (URL). When a path to a server computer providing content is specified as access information associated with the detected operation, it is determined that an instruction to access a server computer is involved. If it is determined that an instruction to access a server computer is involved, the process proceeds to step 412. Otherwise, the process proceeds to step 414.

For example, in the home screen in FIG. 5, when the key 160 or the key 162 is touched, it is determined that the operation involves an instruction to access to a server. In contrast, when the copy key, the facsimile key, or the like is touched, it is determined that the operation does not involve an instruction to access a server.

In step 412, the first controller 112 accesses a server computer in accordance with the access information (path to a server computer) specified by the operation which has been detected in step 404, and obtains data. For example, when the key 160 is touched, the image forming apparatus 100 accesses the first server computer 320. When the key 162 is touched, the image forming apparatus 100 accesses the second server computer 322. As described above, data received from a server computer is data (which may be constituted by multiple files) for displaying an operation screen on the web browser. The data may include information about the no-operation timeout period.

In step 418, the first controller 112 determines whether or not the data received in step 410 includes the no-operation timeout period. If it is determined that the data includes the no-operation timeout period, the process proceeds to step 420. Otherwise, the process proceeds to step 422.

In step 420, the first controller 112 replaces the no-operation timeout period which is currently set, with the no-operation timeout period received in step 412.

In step 422, the first controller 112 performs a process corresponding to the operation which has been detected in step 404. After that, the process returns back to step 402. For example, when the key operation which has been detected in step 404 is an operation for changing the operation screen, the first controller 112 uses the data obtained from the server computer in step 412 so as to generate and display an operation screen. When the key operation which has been detected in step 404 is an operation for obtaining predetermined content, the first controller 112 uses the first image forming unit 118 or the second image forming unit 206 to perform printing in accordance with the content data (for example, image data) obtained from the server computer in step 412.

In step 410, if it is determined that an instruction to access a server computer is not involved, the first controller 112 determines whether or not an instruction to end the process has been received, in step 414. An instruction to end the process is supplied, for example, by pressing the power key 154. If it is determined that an instruction to end the process has been received, the program ends. Otherwise, the process proceeds to step 416.

In step 416, the first controller 112 performs a process corresponding to the operation which has been detected in step 404. After that, the process proceeds to step 402.

In step 404, if it is determined that no operations have been performed, in step 424, the first controller 112 obtains the current time from the timer 130, and determines whether or not the no-operation timeout period has elapsed from the start time stored in the first storage unit 114 in step 402. At that time, the value which is currently stored in the first storage unit 114 is used as the no-operation timeout period. The no-operation timeout period may have been changed from the initial value in step 420. If it is determined that the no-operation timeout period has elapsed, the process proceeds to step 426. Otherwise, the process returns back to step 404.

In step 426, the first controller 112 resets the settings which have been set in user operations, and displays the home screen. At that time, the no-operation timeout period is also set at the initial value. After that, the process returns back to step 402.

As described above, when a user operates the operation unit 120 and selects a content service, data is received from the server computer providing the content service (step 412), and an operation screen is displayed (step 422). For example, in the home screen in FIG. 5, when a user touches the key 160, the first controller 112 receives data from the first server computer 320, generates an operation screen for the content service A, and displays the operation screen on the display panel 122. At that time, if the data received from the first server computer 320 includes the no-operation timeout period (if the determination result in step 418 is YES), the no-operation timeout period in first storage unit 114 is changed to the received value.

If the user operation is not an operation to request an access to a server computer (if the determination result in step 410 is NO), for example, if a service (such as a copy service or a scan service) which may be provided by the image forming apparatus 100 by itself has been selected, and if the operation is an operation performed on an operation screen for the selected service, a corresponding process is performed in step 416. For example, when a copy service is selected, processes are performed in accordance with operations in the setting screen for print conditions (color/monochrome printing, the size of recording paper, single-sided/double-sided printing, image quality, and the like), operations in a charge confirming screen, and the like.

Even during provision of any service, in the state in which an operation screen is displayed, when no user operations have been performed, steps 404 and 424 are repeatedly performed. When the no-operation timeout period has elapsed without operations performed after that, the settings which have been set so far are reset, and the home screen is displayed (step 426).

As described above, the no-operation timeout period may be changed in step 420. If it is expected that, in use of a content service, a user performs no operations on the operation unit 120 for a long time (for example, if a user is likely to vacillate over many options), when data for displaying the top page (operation screen) of a content service is transmitted from a server computer, the no-operation timeout period is transmitted at the same time. Thus, the image forming apparatus 100 determines whether or not a timeout is to occur by using the received no-operation timeout period. Therefore, a content provider may set a no-operation timeout period appropriate for a content service to be provided. Thus, a situation in which a no-operation timeout occurs while a user is using a content service, and in which the settings which have been set so far come to nothing may be avoided.

A server computer providing a content service transmits the no-operation timeout period to the image forming apparatus 100. When the content provider changes the service, the content provider just changes data to be transmitted to the image forming apparatus 100, in order to address the change in service. An operation for changing settings of the image forming apparatus 100 in advance is unnecessary, enabling the service to be efficiently changed.

When a user selects another service, the no-operation timeout period which has been changed is returned to the initial value in step 408. Therefore, a situation is avoided in which a service (such as a copy service or a scan service) which may be provided by the image forming apparatus 100 by itself is performed in the state in which a value different from the initial value is set to the no-operation timeout period.

As described above, the case in which, when data for the top page (operation screen) of a content service is transmitted from a server computer providing the content service, the no-operation timeout period is transmitted is described. The embodiment is not limiting. In the content service, a transition to another operation screen occurs in accordance with a user operation. Therefore, every time a transition occurs, the image forming apparatus 100 obtains data used to generate a new operation screen, from the server computer in step 412. Therefore, when data for an operation screen is transmitted from the server computer, the no-operation timeout period appropriate for the operation screen may be transmitted. That is, the no-operation timeout period may be set for each operation screen. Thus, the image forming apparatus 100 may set an appropriate no-operation timeout period for each operation screen.

In the case where the no-operation timeout period is set for each operation screen, instead of determining whether or not an operation for changing a service has been performed, it may be determined whether or not an operation for changing a screen has been performed in step 406. Thus, when an operation for changing a screen is performed, the initial value is set to the no-operation timeout period in step 408. An adverse effect caused when a value which is used in the previous operation screen and which is different from the initial value remains to be used in an operation screen in which the initial value may be used as the no-operation timeout period may be reduced.

In the case where the no-operation timeout period is set for each operation screen, when an operation screen showing a telephone number (for example, the telephone number of a call center) is displayed, a time longer than the initial value may be set to the no-operation timeout period. While a user is calling a call center or the like, a screen operation is not performed, and a time spent talking on a telephone is likely to be long. Therefore, if the initial value is set to the no-operation timeout period, a timeout is likely to occur. Accordingly, when a screen showing a telephone number is displayed, a value larger than the initial value is set to the no-operation timeout period, whereby occurrence of a timeout during a call may be suppressed.

As described above, the example in which, in provision of a content service, every time a transition of the operation screen occurs, data used to generate a screen is obtained from a server computer is described. The embodiment is not limiting. For example, in the case where a key (for example, the key 160 or the key 162) for requesting start of a content service is pressed, and where the predetermined access path is accessed, data for generating multiple operation screens may be transmitted from a server computer at a time. For example, data for generating all of the operation screens in the content service may be transmitted at first. In this case, to set the no-operation timeout period for each operation screen, data for generating an operation screen may be associated with the no-operation timeout period. For example, a file for generating each operation screen may include the no-operation timeout period. If the file has a hypertext format such as Hypertext Markup Language (HTML), a tag representing the no-operation timeout period and data representing a time may be embedded in the header part or the like. In the image forming apparatus 100, when operation screen data is generated, if a tag representing the no-operation timeout period is included in a file to be used, the current no-operation timeout period may be updated with the value which is set in the tag, in displaying the generated operation screen.

In some operation screens, a preview of a movie or music for test-listening may be reproduced. Therefore, when movie data or audio data is transmitted from a server computer, data having an adequate no-operation timeout period is desirably transmitted. If a time longer than the reproduction time of the movie data or the audio data is set to the no-operation timeout period, a situation in which a user feels uncomfortable with a no-operation timeout which occurs while the user is viewing a movie or listening to music may be avoided.

Some services may involve a collaborative operation between the image forming apparatus 100 and a portable terminal such as a smartphone. For example, when a portable terminal is operated so that a Wireless Fidelity (Wi-Fi) connection to the image forming apparatus 100 is established, a timeout may occur during the operation of the portable terminal because the operation unit 120 of the image forming apparatus 100 is not operated. Therefore, when an operation screen for requesting an operation of an external apparatus is displayed on the operation unit 120 of the image forming apparatus 100, a value larger than the initial value is desirably set to the no-operation timeout period.

Second Embodiment

In the first embodiment, the no-operation timeout period is changed in accordance with a content service or an operation screen. In a second embodiment, the no-operation timeout period is changed in consideration of the operation history of a user. The image forming apparatus according to the second embodiment has configurations similar to those of the first embodiment (FIGS. 1 to 5). The reference numerals in FIGS. 1 to 5 will be used below.

Figure 7:
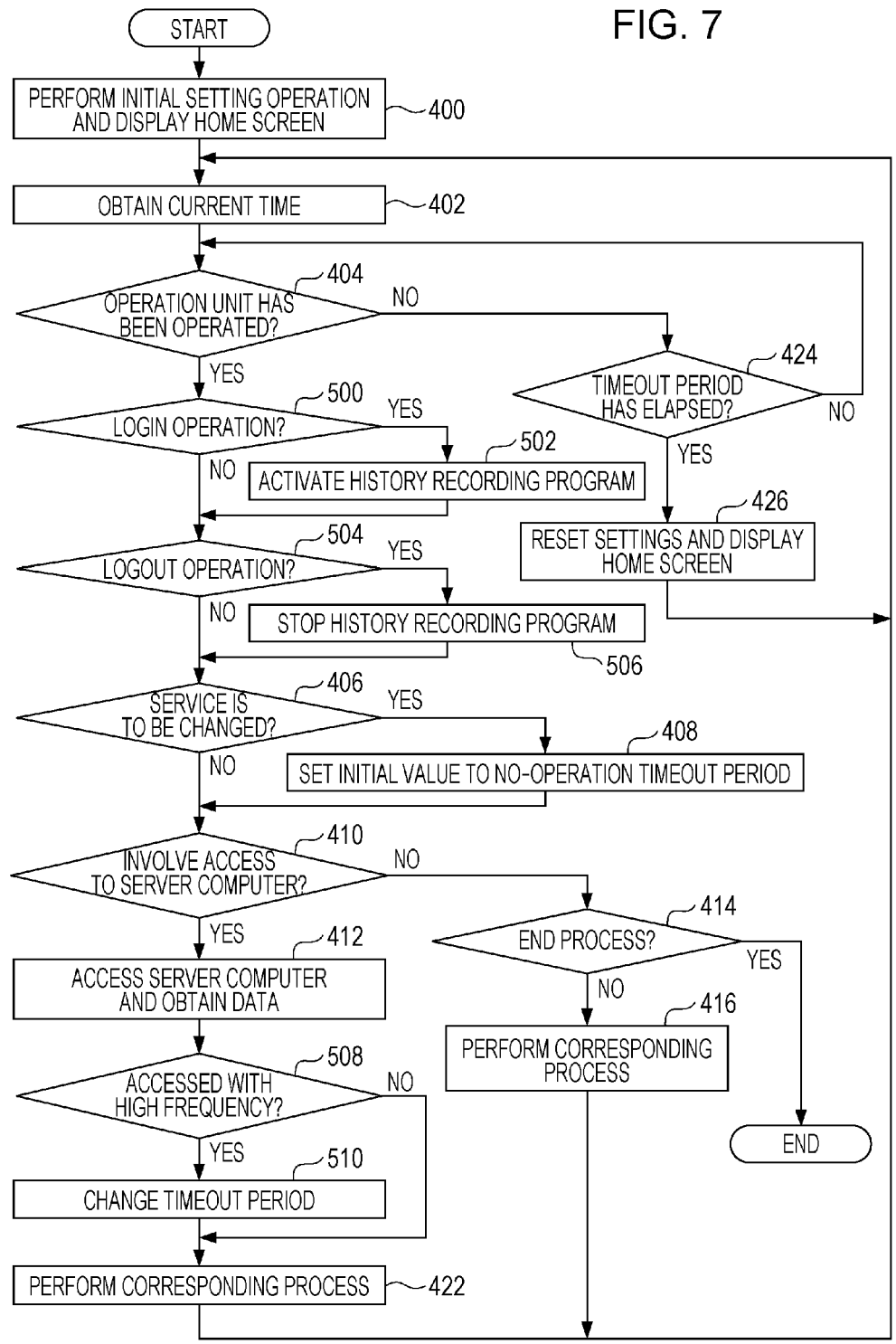
FIG. 7 is a flowchart illustrating the control structure of a program which is executed in an image forming apparatus according to a second embodiment of the disclosure to provide a service by changing a timeout period as appropriate.

In the image forming apparatus according to the second embodiment, the program in FIG. 7 is executed in order to change the no-operation timeout period in accordance with the operation history of each user. The flowchart in FIG. 7 is different from that in FIG. 6 in that steps 500 to 504 are added and in that steps 418 and 420 are replaced with steps 508 and 510, respectively.

In this example, in the image forming apparatus 100, users who have permission to use the image forming apparatus 100 are registered in advance. The user authentication for permitting use of the image forming apparatus 100 is performed by using a user name and a password. Unlike the first embodiment, a server computer providing a content service does not transmit the no-operation timeout period.

Referring to FIG. 7, when the power of the image forming apparatus 100 is turned on, similarly to the first embodiment, an initial setting operation is performed in step 400, and the current time is obtained and stored as a start time in step 402. After that, in step 404, it is determined whether or not the operation unit 120 has been operated. If it is determined that the operation unit 120 has been operated, the process proceeds to step 500.

In step 500, the first controller 112 determines whether or not the operation is an operation for login authentication. Specifically, the first controller 112 determines whether or not, in the state in which a screen (login authentication screen) for inputting a user name and a password is displayed on the operation unit 120, a user name and a password have been input. If it is determined that the operation is an operation for login authentication, the process proceeds to step 502. Otherwise, the process proceeds to step 504. A login authentication screen is displayed in response to a user operation in step 416.

In step 502, the first controller 112 activates a history recording program in response to success in login authentication. The history recording program is another program different from the program for executing the flowchart in FIG. 7, and a program for recording a history of content services which have been used by a login user. History information about operations which were performed are stored in association with information specifying a user, in the HDD of the first storage unit 114. When the history recording program is activated, history information which describes operations that were performed and which corresponds to information specifying the current login user is read from the HDD. When a content service is selected through a new operation and an instruction to access a server computer is supplied, the access path is stored.

In step 504, the first controller 112 determines whether or not the operation is a logout operation. Specifically, the first controller 112 determines whether or not a logout key on an operation screen displayed on the operation unit 120 has been selected. If it is determined that the operation is a logout operation, the process proceeds to step 506. Otherwise, the process proceeds to step 406.

In step 506, the first controller 112 stops the history recording program which has been activated. The history recording program is terminated after the latest history information is stored in the HDD of the first storage unit 114.

After that, similarly to the first embodiment, steps 406 to 416 are executed. In step 410, if it is determined that the operation which has been detected in step 404 involves an instruction to access a server computer, the history recording program activated in step 502 causes the access path to be added to the history information.

After data is obtained from a server computer in step 412, the first controller 112 determines whether or not the access destination has been accessed with a high frequency, in step 508. Specifically, the first controller 112 determines whether or not the access path used to obtain data appears in the history information for a predetermined number of times or more. For example, the first controller 112 determines whether or not the access path appears in the history information at least twice (whether or not the access path has been accessed before). If it is determined that the access destination has been accessed with a high frequency, the process proceeds to step 510. Otherwise, the process proceeds to step 422.

In step 510, the first controller 112 decreases the no-operation timeout period which is currently set. For example, if the initial value is 120 seconds, a smaller value, such as 100 seconds, 90 seconds, or 60 seconds, is set to the no-operation timeout period.

After that, if no user operations have been performed, steps 404 and 424 are repeatedly performed. In the determination process in step 424, the no-operation timeout period which has been changed in step 510 is used. If the user has used the same content service before, the user is familiar with the screen operation. Therefore, a time shorter than the initial value may be set to the no-operation timeout period.

As described above, when a user uses a content service which is often used by the user, or at least when a user uses a content service which has been used before by the user, the no-operation timeout period may be made shorter. Thus, a time for waiting a user operation for nothing may be reduced. For example, assume that a user accesses a server computer to use a content service by using the image forming apparatus 100 installed in a convenience store. However, the user may stop operating the image forming apparatus 100 during the operation, and may leave the convenience store in the state in which an operation screen of the content service has been displayed. In this case, a no-operation timeout may occur in a short time, and the home screen may be displayed. Therefore, the next user may immediately use the image forming apparatus 100.

The no-operation timeout period may be changed in accordance with the frequency of use of a content service, specifically, in accordance with the frequency of access to the server computer providing the content service. For example, as the frequency of use becomes high, the no-operation timeout period may be switched from the initial value to a smaller value.

The no-operation timeout period may be changed not only in consideration of the frequency of use of each content service by each user but also in accordance with the frequency (for example, the frequency of access to a file for an operation screen of the server) with which each operation screen of a content service is displayed. Thus, even in the case where a user uses a content service which is often used by the user, when an operation screen which has not been operated by the user at any time is displayed, the user may have a trouble in operation. Accordingly, the no-operation timeout period may be made longer (for example, may be returned back to the initial value).

As described above, the case in which the no-operation timeout period is changed from the initial value without transmitting the value of the no-operation timeout period from a server computer is described. The embodiment is not limiting. Similarly to the first embodiment, a server computer may transmit the value of the no-operation timeout period. In this case, the no-operation timeout period (the no-operation timeout period transmitted from a server computer) which is set by a content service provider may be changed in accordance with the frequency of use of the content service by a user.

Third Embodiment

In the first embodiment, the no-operation timeout period is changed in accordance with a content service or an operation screen. In a third embodiment, even when the same operation screen is displayed, the no-operation timeout period is changed in accordance with the condition. The image forming apparatus according to the third embodiment has configurations similar to those of the first embodiment (FIGS. 1 to 5). The reference numerals in FIGS. 1 to 5 will be used below.

Figure 8:
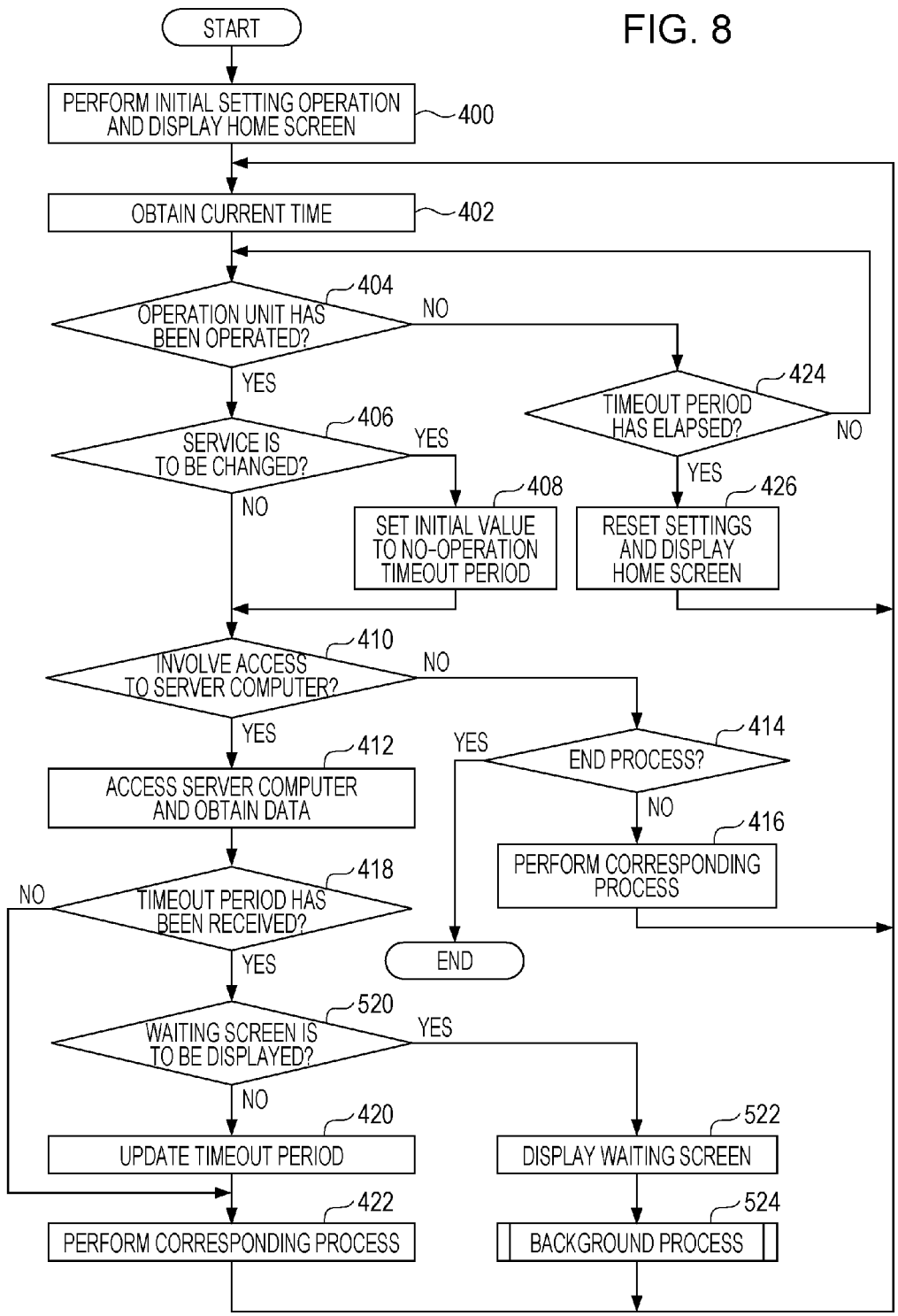
FIG. 8 is a flowchart illustrating the control structure of a program which is executed in an image forming apparatus according to a third embodiment of the disclosure to provide a service by changing a timeout period as appropriate.
Figure 9:
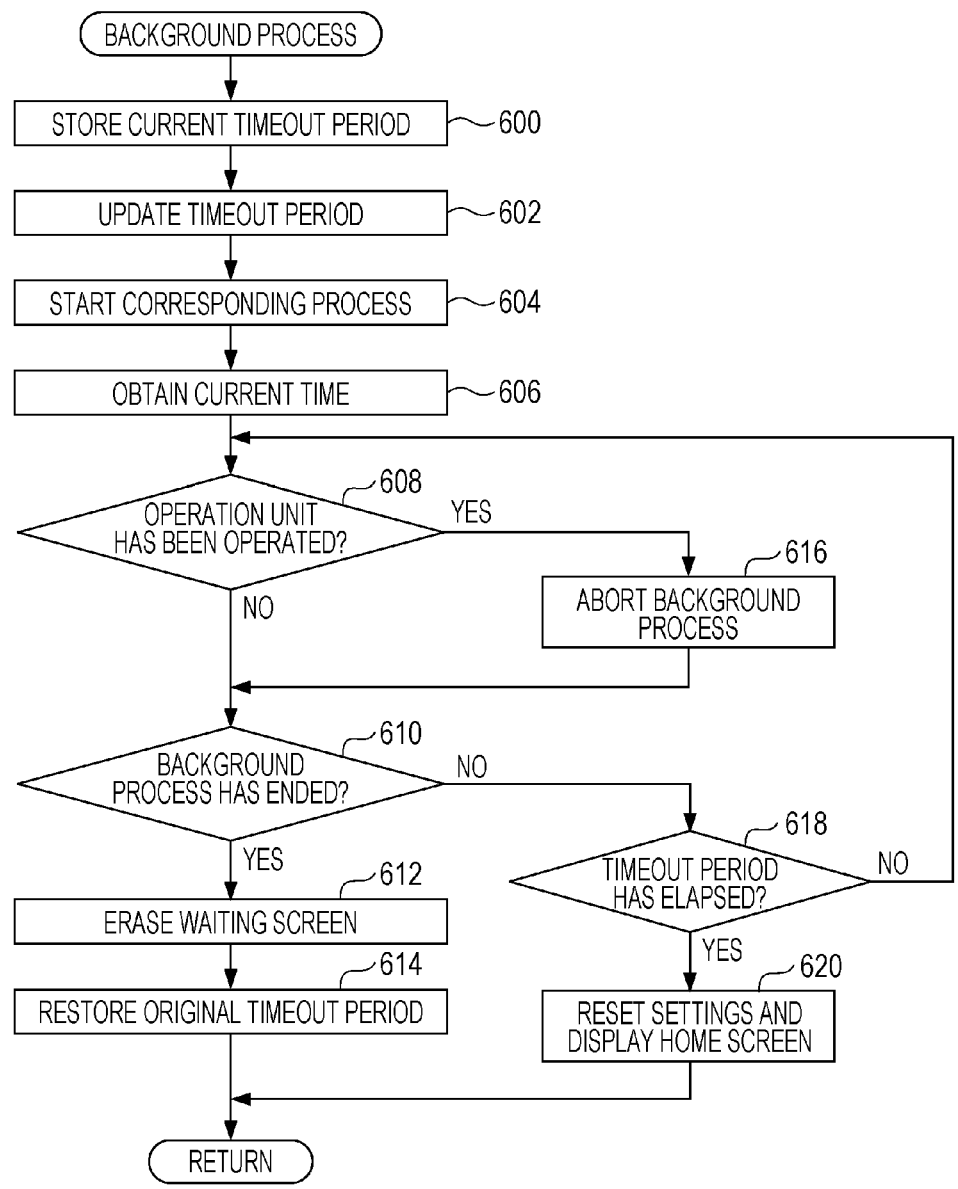
FIG. 9 is a flowchart illustrating a background process illustrated in FIG. 8.

In the image forming apparatus according to the third embodiment, programs illustrated in FIGS. 8 and 9 are executed in order to change the no-operation timeout period in accordance with the state of an operation screen. The flowchart in FIG. 8 is different from that in FIG. 6 in that steps 520 to 524 are added. The process in step 524 is specifically illustrated in FIG. 9.

Similarly to the first embodiment, it is assumed that data about the no-operation timeout period corresponding to an operation screen is transmitted from a server computer providing a content service. When the image forming apparatus 100 receives a user operation in an operation screen, the image forming apparatus 100 may display a waiting screen on the same screen without screen transitions so as to perform a process as a background job. For example, when a user selects a piece of content (large-size image data) and supplies an instruction to download the content, the download takes relatively long time. To notify the user of the state in which the process is being performed, the download is performed in the state in which a waiting screen is displayed.

Referring to FIG. 8, when the power of the image forming apparatus 100 is turned on, similarly to the first embodiment, an initial setting operation is performed in step 400, and the current time is obtained and stored as a start time in step 402. After that, if it is determined that an operation has been received in step 404, steps 406 to 418 are executed. If it is determined that no operations have been received, steps 424 and 426 are performed.

In step 418, if it is determined that data received in step 410 includes the no-operation timeout period, the first controller 112 determines whether or not the operation involves displaying of a waiting screen, in step 520. For example, as described above, if the operation involves an instruction to download image data from a server computer, the image forming apparatus 100 receives image data of a waiting screen 170 illustrated in FIG. 10 and the no-operation timeout period from a server computer in step 412. The waiting screen 170 is displayed in such a manner as to overlie the operation screen which has already been displayed. If it is determined that the operation involves displaying of a waiting screen, the process proceeds to step 522. Otherwise, the process proceeds to step 420.

Figure 10:
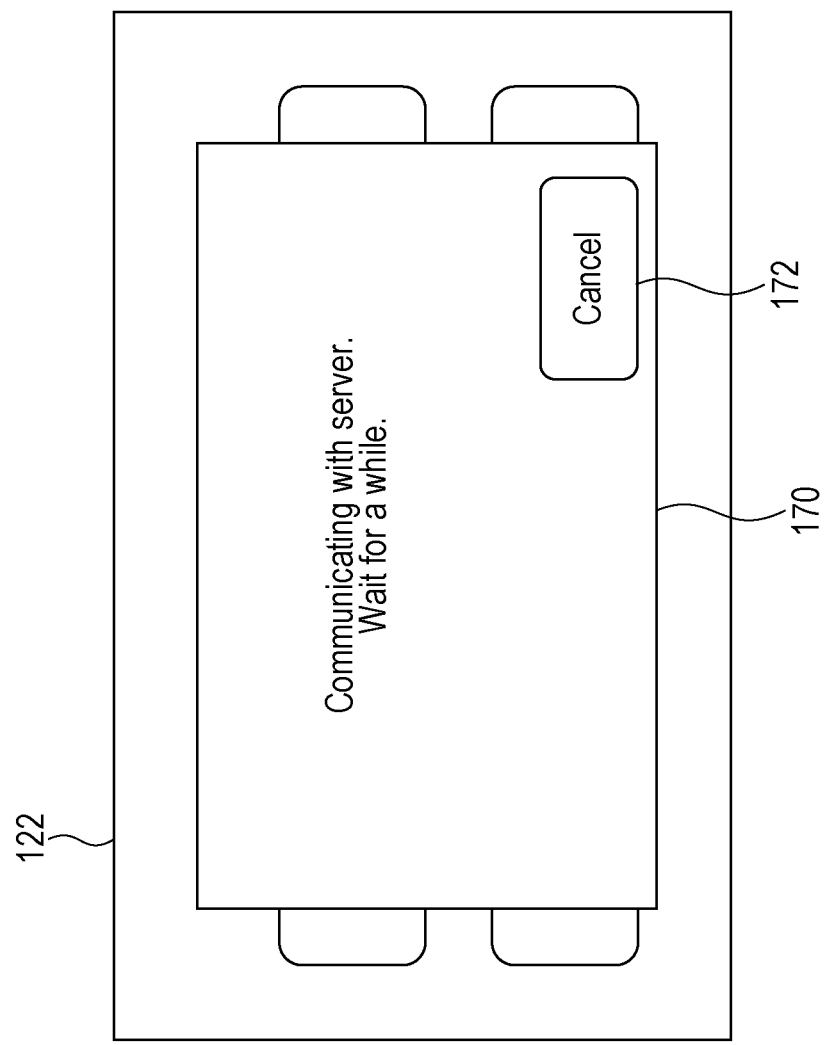
FIG. 10 is a diagram illustrating a state in which a waiting screen (window) is displayed on an operation screen.

In step 522, the first controller 112 displays the waiting screen (image data received in step 412) on the operation screen which is currently displayed on the display panel 122. Specifically, the video RAM (which stores image data of the operation screen) for the display panel 122 is overwritten with image data of the waiting screen. Thus, for example, as illustrated in FIG. 10, a screen in which the waiting screen 170 overlies the operation screen is displayed.

In step 524, the first controller 112 performs a background process. Specifically, a program in FIG. 9 is executed.

Referring to FIG. 9, the first controller 112 stores the no-operation timeout period (no-operation timeout period which is currently set) which is currently stored in a predetermined area in the RAM of the first storage unit 114, also in a second area in the RAM in step 600. This is a process for returning the no-operation timeout period back to the original value when the waiting screen is to be erased.

In step 602, the first controller 112 updates the no-operation timeout period which is currently set, with the no-operation timeout period received in step 412.

In step 604, the first controller 112 starts a process according to the operation which has been detected in step 404.

In step 606, as in step 402, the first controller 112 obtains the current time from the timer 130, and stores the current time as a start time in the first storage unit 114.

In step 608, as in step 404, the first controller 112 determines whether or not the operation unit 120 has been operated. If it is determined that the operation unit 120 has been operated, the process proceeds to step 616. Otherwise, the process proceeds to step 610. As illustrated in FIG. 10, the waiting screen 170 contains no other keys but the cancel key 172 which may be operated. Therefore, if the cancel key 172 is touched, it is determined that the operation unit 120 has been operated.

In step 610, the first controller 112 determines whether or not the background process performed in the state in which the waiting screen is displayed has ended. If it is determined that the background process has ended, the process proceeds to step 612. Otherwise, the process proceeds to step 618.

In step 612, the first controller 112 erases the displayed waiting screen. Specifically, the first controller 112 reads image data of an operation screen (screen displayed in the background of the waiting screen) stored in the first storage unit 114, and overwrites the video RAM with the read image data. Thus, the original operation screen without the waiting screen is displayed.

In step 614, the first controller 112 reads data (the same data as the original no-operation timeout period) stored in the second area in the RAM of the first storage unit 114 in step 600, and sets the read data to the no-operation timeout period. After that, the process returns back to the flowchart in FIG. 8.

If it is determined that the background process has not ended in step 610, in step 618, the first controller 112 obtains the current time from the timer 130, and determines whether or not the no-operation timeout period has elapsed from the start time stored in the first storage unit 114 in step 606. At that time, the value which has been set in step 602 is used as the no-operation timeout period. If the no-operation timeout period has elapsed, the process proceeds to step 620. Otherwise, the process returns back to step 608.

In step 620, the first controller 112 resets settings, and displays the home screen. At that time, the no-operation timeout period is also set at the initial value. After that, the process returns back to the flowchart in FIG. 8.

If it is determined that the operation unit 120 has been operated in step 608, the first controller 112 aborts the background process in step 616. In the waiting screen 170 in FIG. 10, when the cancel key 172 is selected (touched), it is determined that the operation unit 120 has been operated. The determination result in step 610 which is performed after step 616 is YES. Steps 612 and 614 are executed, and the process returns back to the flowchart in FIG. 8.

After the process returns back from the flowchart in FIG. 9 to the flowchart in FIG. 8, the process returns back to step 402.

As described above, in the state in which a waiting screen is displayed on an operation screen which has been already displayed, while the background process is being performed, the determination process in step 618 uses the no-operation timeout period which has been set in step 602. Therefore, in the case where the background process takes long time, if the server computer transmits the no-operation timeout period which is long enough to complete the background process, along with image data of the waiting screen, the image forming apparatus 100 may set a value larger than that of the no-operation timeout period used when the original operation screen is displayed, to the no-operation timeout period. Thus, a situation in which occurrence of a no-operation timeout causes the background process to be aborted before completion of the background process may be avoided.

When the background process performed in the state in which a waiting screen is displayed ends, the no-operation timeout period is returned back to the original value which was set for the operation screen displayed in the background of the waiting screen (step 614). Therefore, after the waiting screen is erased, an adequate no-operation timeout period is used in the original operation screen, and a user may operate the screen without feeling uncomfortable.

As described above, the case in which image data of a waiting screen and a corresponding no-operation timeout period are received from a server computer is described. The embodiment is not limiting. If a process in which a waiting screen is to be displayed is specified in advance, image data of the waiting screen and the no-operation timeout period may be stored in the HDD of the first storage unit 114. In this case, when the process is specified, image data of the waiting screen and the no-operation timeout period may be read from the first storage unit 114 so that the waiting screen is displayed and that the no-operation timeout period is changed.

The case in which the no-operation timeout period is changed when a waiting screen is to be displayed is not limited to the case in which communication with a server computer is performed (the case in which image data is downloaded) as described above. The no-operation timeout period may be changed if it is expected that a process performed in the background in accordance with a user operation takes time longer than the no-operation timeout period which is set in the image forming apparatus. For example, displaying of a waiting screen and change of the no-operation timeout period may be also performed in a print process (especially, a process of printing color content, i.e., image data, having a high resolution), a data compression process, a process of decompressing compressed data, or the like.

In the first to third embodiments, the no-operation timeout period is changed when a server computer provides a content service. The service provided from a server computer is not limited to a content service. The service may be any as long as the image forming apparatus 100 receiving data about an operation screen or the like from a server computer causes the service to be provided for a user. It is desirable to change the no-operation timeout period to an adequate value for each service or each operation screen of the service.

It is unnecessary for the no-operation timeout period to be received from a server computer providing a content service. Information specifying a content service or a content server and a no-operation timeout period corresponding to the content service or the content server may be stored in advance in the HDD of the first storage unit 114 in the image forming apparatus 100. When a user selects a specific content service (content server), the value of the corresponding no-operation timeout period may be read from the HDD, and may be used as a new no-operation timeout period. The same is true for the case in which the no-operation timeout period is set for each operation screen.

In the first to third embodiments, the case in which the image forming apparatus 100 includes the apparatus body 110 and the extension apparatus 200 is described. The embodiment is not limiting. For example, a configuration may be employed in which the first controller 112 and the second controller 202 are formed as a single unit; the first storage unit 114 and the second storage unit 204 are formed as a single unit; the first bus 132 and the second bus 216 are formed as a single unit; and the second communication unit 128 and the third communication unit 210 are omitted.

The embodiments are described. However, the embodiments described above are exemplary. The embodiments are not limiting. Various modifications may be made.

The present disclosure contains subject matter related to that disclosed in Japanese Priority Patent Application JP 2014-160480 filed in the Japan Patent Office on Aug. 5, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
    a display that displays an operation screen;
    a controller that detects a user operation on the operation screen;
    a timer that measures a period during which the controller does not detect an operation;
    a storage that, when no user operations are continuously detected, stores a timeout period which is an upper limit time until a timeout process of displaying a home screen that includes a key is performed; and
    a network communicator that receives provision of a service from an external apparatus via a communication network; wherein the controller determines whether or not the timeout period has elapsed, by using the timer;

the controller causes the display to perform the timeout process, when the controller determines that the timeout period has elapsed; and when the controller detects a user selecting a predetermined service, the storage changes the timeout period in accordance with the selected predetermined service or the external apparatus providing the selected predetermined service.

2. The image forming apparatus according to claim 1, wherein the storage stores an access history of access to at least one external apparatus for each user;

when the user selects the predetermined service, the controller determines whether or not the storage contains an access history of access to the external apparatus providing the predetermined service selected by the user, and when the controller determines that the storage contains the access history, the storage changes the stored timeout period.

3. The image forming apparatus according to claim 1, wherein the storage stores an access history of access to at least one operation screen of at least one content service for each user;

when the user selects a predetermined operation screen to be displayed, the controller determines whether or not the storage contains an access history of access to the predetermined operation screen which is selected by the user, and when the controller determines that the storage contains the access history, the storage changes the stored timeout period.

4. The image forming apparatus according to claim 1, wherein when the display is to change the operation screen in response to the user operation detected by the controller, the storage changes the stored timeout period in accordance with information included in an operation screen which is to be displayed.

5. The image forming apparatus according to claim 4, wherein the information is a telephone number of a call center.

6. The image forming apparatus according to claim 4, wherein the information is information about an operation of an apparatus other than the image forming apparatus, the information being involved in provision of a service selected by a user, the provision of the service being performed by the image forming apparatus.

7. The image forming apparatus according to claim 4, wherein the information is sound data or movie data which is being reproduced.

8. The image forming apparatus according to claim 4, wherein the information is information about a waiting screen.

9. An image forming apparatus comprising:

a display that displays an operation screen;

a controller that detects a user operation on the operation screen;

a timer that measures a period during which the controller does not detect an operation;

a storage that, when no user operations are continuously detected, stores a timeout period which is an upper limit time until a timeout process of displaying a home screen is performed; and a network communicator that receives provision of a service from an external apparatus via a communication network; wherein the controller determines whether or not the timeout period has elapsed, by using the timer;

the controller causes the display to perform the timeout process, when the controller determines that the timeout period has elapsed; and when the controller detects a user selecting a predetermined service, the storage changes the timeout period in accordance with the selected predetermined service or the external apparatus providing the selected predetermined service;

the network communicator receives time data and operation-screen data to generate an operation screen that makes the service provided by the external apparatus available to the user, the storage stores the received time data as the timeout period, and when the display displays the operation screen on the basis of the received operation-screen data, the controller uses the timeout period which is the received time data, so as to determine whether or not the timeout period has elapsed.

10. An image forming apparatus comprising:

display means for displaying an operation screen;

detection means for detecting a user operation on the operation screen;

time measurement means for measuring a period during which the detection means does not detect an operation;

storage means for, when no user operations are continuously detected, storing a timeout period which is an upper limit time until a timeout process of displaying a home screen that includes a key is performed;

determining means for determining whether or not the timeout period has elapsed, by using the time measurement means;

control means for causing the display means to perform the timeout process, when the determining means determines that the timeout period has elapsed; and communication means for receiving provision of a service from an external apparatus via a communication network, wherein, when the detection means detects a user selecting a predetermined service, the storage means changes the timeout period in accordance with the selected predetermined service or the external apparatus providing the selected predetermined service.

* * * * *

UNITED STATES PATENT AND TRADEMARK OFFICE
CERTIFICATE OF CORRECTION

PATENT NO. : 9,794,439 B2
APPLICATION NO. : 14/749871
DATED : October 17, 2017
INVENTOR(S) : Daisuke Nago It is certified that error appears in the above-identified patent and that said Letters Patent is hereby corrected as shown below:

On the Title Page

The following should be added:
(30) Foreign Application Priority Data
Aug. 6, 2014 (JP) ............ 2014-160480

Signed and Sealed this
First Day of October, 2019

Andrei Iancu
*Director of the United States Patent and Trademark Office*